(12) United States Patent
Kuwabara et al.

(10) Patent No.: US 7,638,773 B2
(45) Date of Patent: Dec. 29, 2009

(54) CASSETTE

(75) Inventors: Takeshi Kuwabara, Kanagawa (JP);
Eiichi Kito, Kanagawa (JP); Tsuyoshi Tanabe, Kanagawa (JP); Takuya Yoshimi, Kanagawa (JP); Kazuharu Ueta, Tokyo (JP); Makoto Iriuchijima, Gunma (JP); Yasunori Ohta, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/219,481

(22) Filed: Jul. 23, 2008

(65) Prior Publication Data
US 2009/0026377 A1     Jan. 29, 2009

(30) Foreign Application Priority Data
Jul. 23, 2007  (JP) ........................... 2007-190653
Jun. 9, 2008   (JP) ........................... 2008-150347

(51) Int. Cl.
*G01T 1/24*  (2006.01)
(52) U.S. Cl. ............................................. 250/370.08
(58) Field of Classification Search ............ 250/370.08
See application file for complete search history.

(56) References Cited

U.S. PATENT DOCUMENTS

| | | | | |
|---|---|---|---|---|
| D416,257 S | * | 11/1999 | Simmons | D14/191 |
| D450,679 S | * | 11/2001 | Soh | D14/191 |
| 6,344,652 B1 | * | 2/2002 | Shoji | 250/370.09 |
| D454,857 S | * | 3/2002 | Carava, Jr. | D14/191 |
| 6,855,936 B2 | * | 2/2005 | Yamamoto | 250/370.09 |
| 7,109,491 B2 | * | 9/2006 | Shinden | 250/370.09 |
| 7,242,005 B2 | * | 7/2007 | Funabashi | 250/370.01 |
| 7,250,608 B2 | * | 7/2007 | Ozeki | 250/370.08 |
| 7,365,337 B2 | * | 4/2008 | Tsuchino et al. | 250/370.09 |
| 2003/0071048 A1 | * | 4/2003 | Black et al. | 221/2 |
| 2004/0079908 A1 | * | 4/2004 | Ohkubo | 250/582 |
| 2005/0206769 A1 | * | 9/2005 | Kump et al. | 348/333.01 |
| 2005/0211907 A1 | * | 9/2005 | Wendt et al. | 250/370.07 |
| 2005/0222871 A1 | * | 10/2005 | Motoki | 705/2 |
| 2007/0152179 A1 | * | 7/2007 | Mair et al. | 250/584 |
| 2008/0054182 A1 | * | 3/2008 | Yokoyama et al. | 250/370.09 |

FOREIGN PATENT DOCUMENTS

JP     2003-172783     6/2003

* cited by examiner

*Primary Examiner*—David P Porta
*Assistant Examiner*—Djura Malevic
(74) *Attorney, Agent, or Firm*—Jean C. Edwards, Esq.; Akerman Senterfitt

(57) ABSTRACT

A radiation detecting cassette includes a casing having first through fourth display units mounted on respective side walls thereof for displaying ID information of a patient, etc. The casing also has first detectors on the respective side walls for detecting obstacles facing the first through fourth display units and second detectors on the respective side walls for detecting loads applied to the casing near the first through fourth display units. Based on detected results from the first and second detectors, at least one of the first through fourth display units which is not covered by the patient is selected to display the ID information of a patient, etc.

5 Claims, 9 Drawing Sheets

CASSETTE

CROSS-REFERENCE TO RELATED APPLICATIONS

The present application claims priority from Japanese Patent Application Nos. 2007-190653, filed Jul. 23, 2007, and 2008-150347 filed Jun. 9, 2008, the contents of both of which are herein incorporated by reference in their entirety.

BACKGROUND OF THE INVENTION

1. Field of the Invention

The present invention relates to a cassette housing therein a radiation conversion panel for converting a radiation that has passed through a subject into radiation image information.

2. Description of the Related Art

In the medical field, there have widely been used radiation image capturing apparatus which apply a radiation to a subject and guide the radiation that has passed through the subject to a radiation conversion panel, which captures a radiation image from the radiation. Known forms of the radiation conversion panel include a conventional radiation film for recording a radiation image by way of exposure, and a stimulable phosphor panel for storing a radiation energy representing a radiation image in a phosphor and reproducing the radiation image as stimulated light by applying stimulating light to the phosphor. The radiation conversion panel is housed in a cassette having a casing. The radiation film with the recorded radiation image is supplied to a developing device to develop the radiation image, or the stimulable phosphor panel is supplied to a reading device to read and obtain the radiation image as a visible image.

As disclosed in Japanese Laid-Open Patent Publication No. 2003-172783, the cassette comprises a grid for removing scattered radiation rays, an operation pad including a power supply switch, etc., and a display unit for displaying operational information entered from the operation pad, patient information, a warning, etc., all mounted on a plate of the casing.

The display unit of the cassette is disposed on an upper surface of the casing which faces the patient, i.e., the subject when the patient lies over the cassette for capturing a radiation image of the patient, the display unit is covered by the patient, making it difficult for surgeons and other staff members to see the display unit and confirm the patient information, etc. displayed on the display unit.

If the orientation of the casing of the cassette is changed to bring the cassette into alignment with the affected part of the patient, the display unit may be located in a position away from the surgeons and other staff members and hence may not be seen. As a result, the patient information, etc. displayed on the display unit may not easily be confirmed by the surgeons and other staff members. Conversely, if the cassette is located in favor of the visibility of the display unit, the orientation of the casing may be limited, tending to lower the efficiency in capturing radiation images with the cassette.

SUMMARY OF THE INVENTION

It is an object of the present invention to provide a cassette whose display unit for displaying subject information, etc. can easily and reliably be viewed in a desired direction by a person who handles the cassette.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
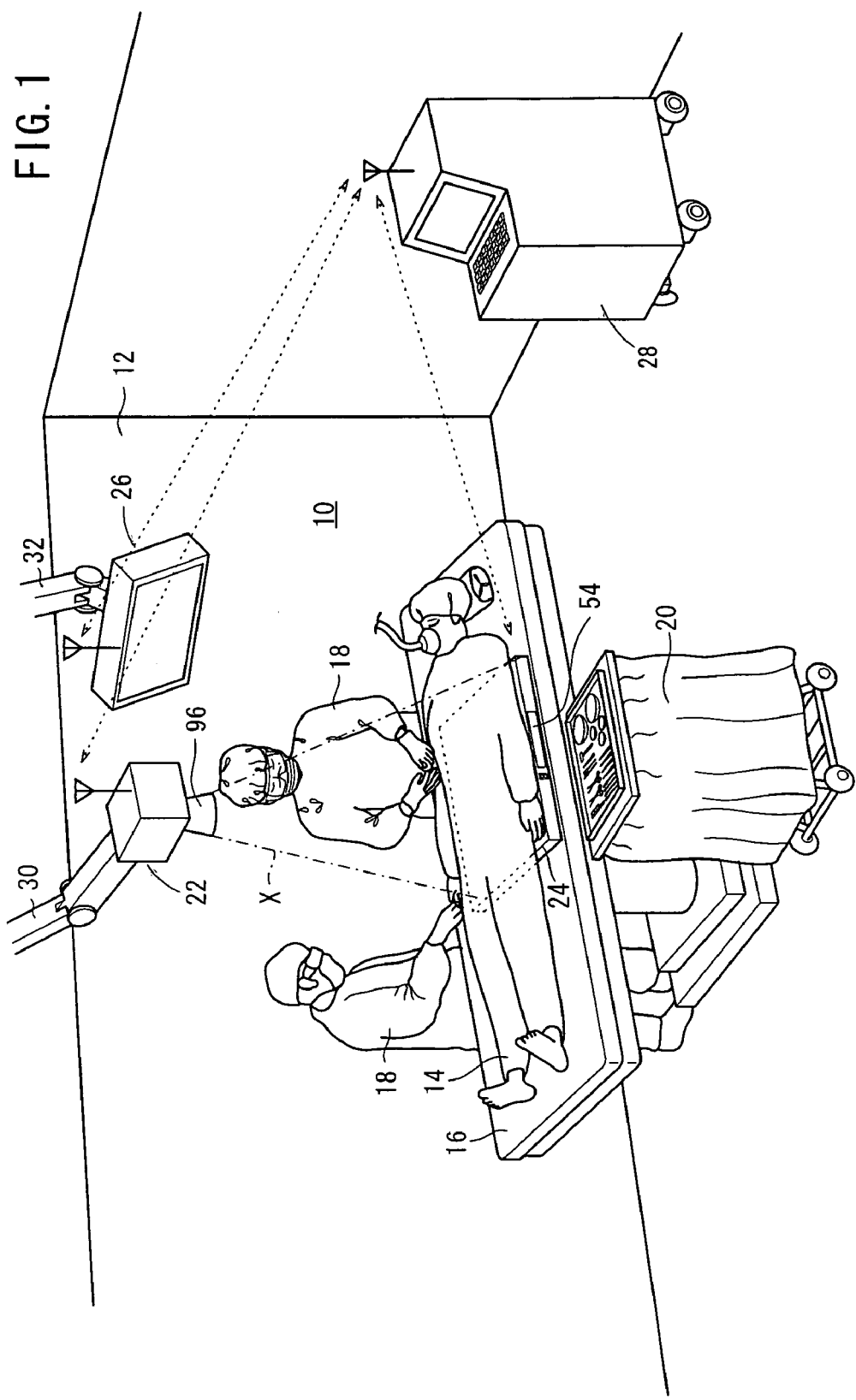
FIG. 1 is a perspective view of an operating room incorporating a radiation image capturing system which uses a cassette according to an embodiment of the present invention.

Like or corresponding parts are denoted by line or corresponding reference characters throughout views.

As shown in FIG. 1, an operating room 12 incorporates a radiation image capturing system 10 which uses a cassette according to an embodiment of the present invention. The operating room 12 has, in addition to the radiation image capturing system 10, a surgical table (bed) 16 for a patient (subject) 14 to lie thereon, and an instrument table 20 disposed to one side of the surgical table 16 for placing thereon various tools and instruments to be used by surgeons 18 operating on the patient 14. The surgical table 16 is surrounded by various apparatus required for surgical operations, including an anesthesia apparatus, an aspirator, an electrocardiograph, a blood pressure monitor, etc.

The radiation image capturing system 10 includes an image capturing apparatus 22 for irradiating the patient 14 as a subject with a radiation X at a dose according to image capturing conditions, a radiation detecting cassette (cassette) 24 housing therein a radiation detector (radiation conversion panel) 44, to be described later, for detecting the radiation X that has passed through the patient 14, a display device 26 for displaying a radiation image based on the radiation X that is detected by the radiation detector 44, and a console 28 for controlling the image capturing apparatus 22, the radiation detecting cassette 24, and the display device 26. The image capturing apparatus 22, the radiation detecting cassette 24, the display device 26, and the console 28 send and receive signals by way of wireless communications.

The image capturing apparatus 22 is coupled to a universal arm 30 so as to be movable to a desired position for capturing an image at a desired area of the patient 14 and also to be retractable to an out of the way position while the surgeons 18 are performing a surgical operation on the patient 14. Similarly, the display device 26 is coupled to a universal arm 32 so as to be movable to a position where the surgeons 18 can easily confirm a captured radiation image displayed on the display device 26.

Figure 2:
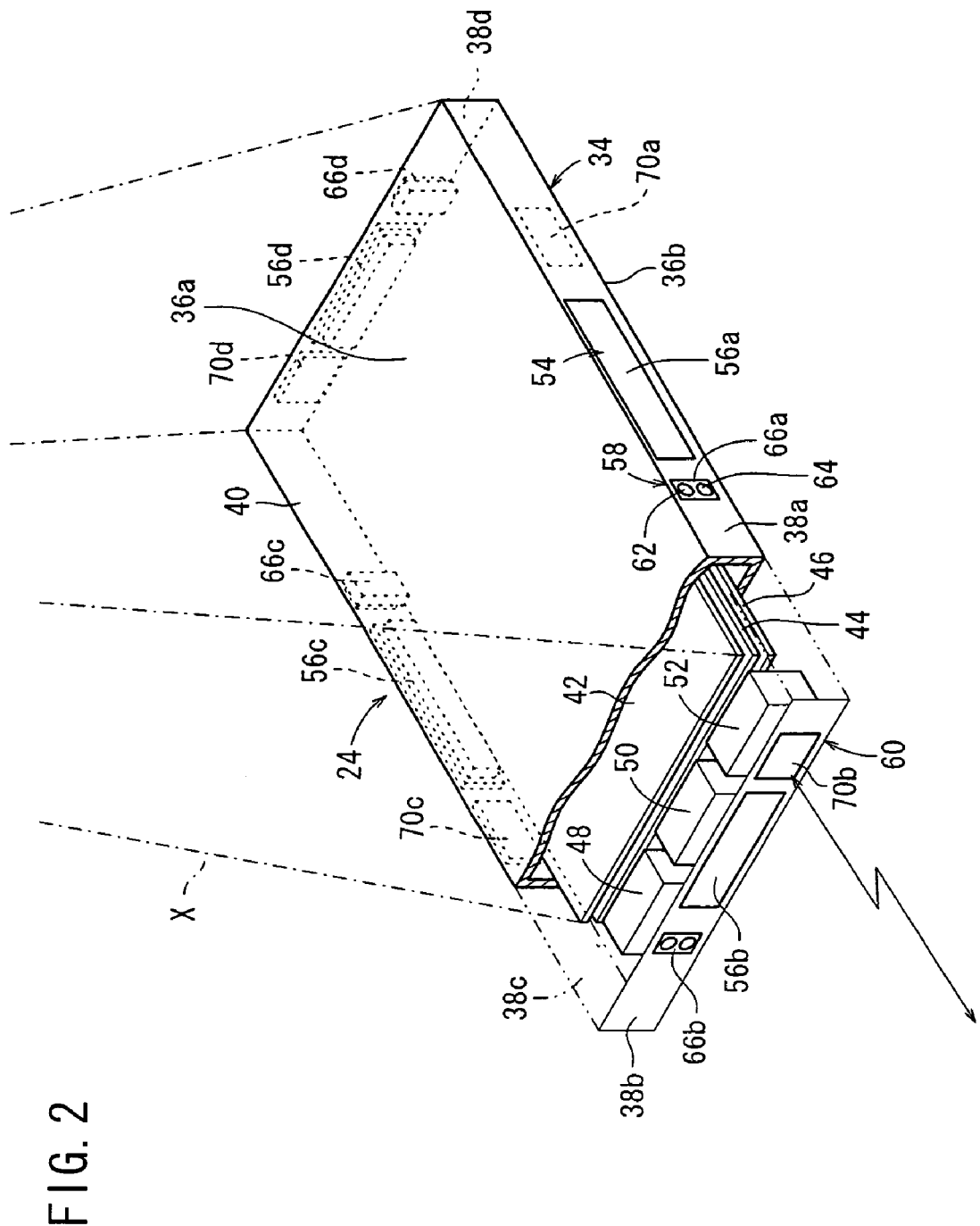
FIG. 2 is a perspective view, partly cut away, showing internal structural details of a radiation detecting cassette as the cassette shown in FIG. 1.
Figure 3:
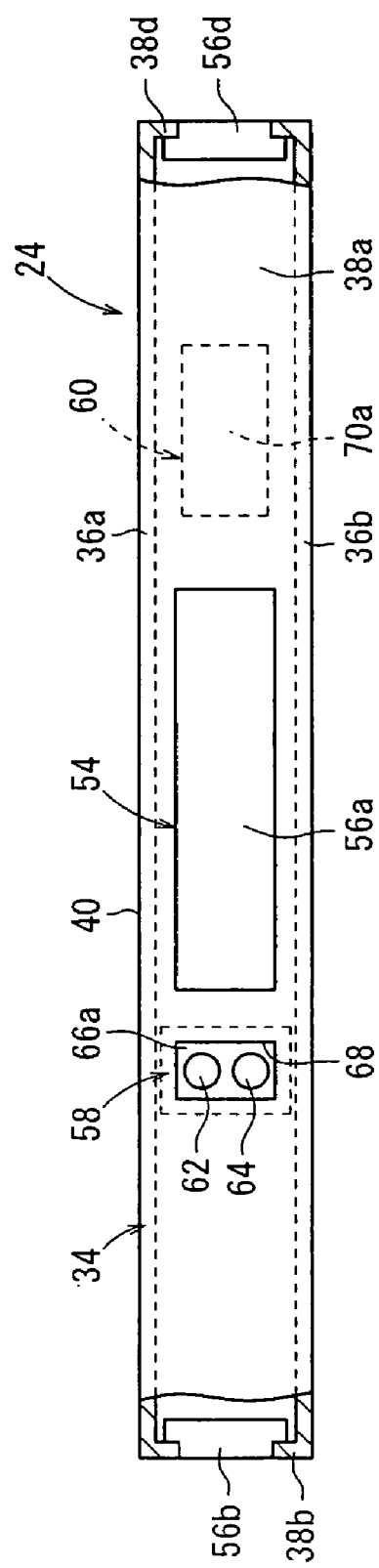
FIG. 3 is a side view of the radiation detecting cassette shown in FIG. 2.
Figure 4:
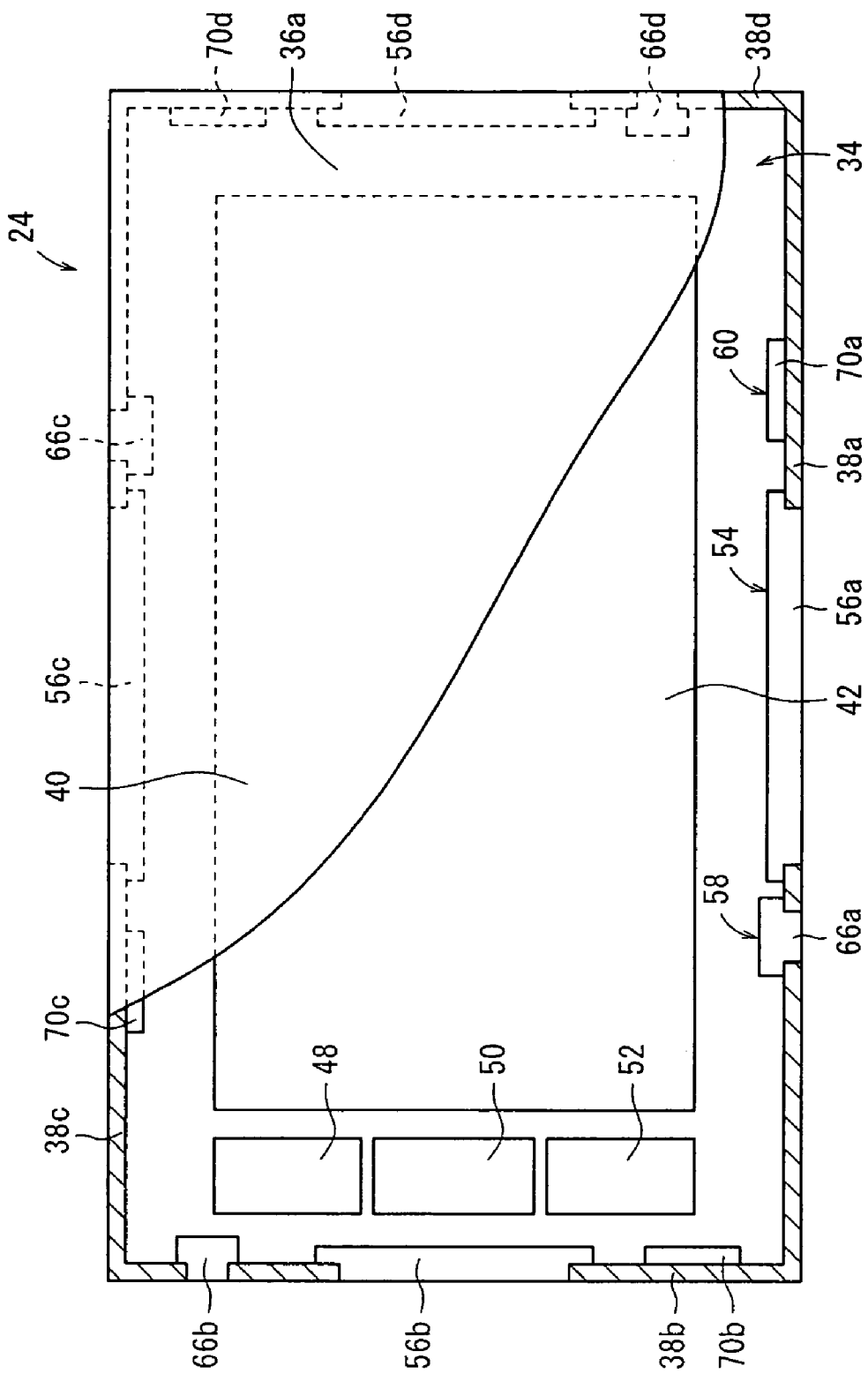
FIG. 4 is a plan view of the radiation detecting cassette shown in FIG. 2.

FIGS. 2 through 4 show structural details of the radiation detecting cassette 24. The radiation detecting cassette 24 has a casing 34 made of a material permeable to the radiation X. The casing 34 comprises a pair of parallel flat plates 36a, 36b spaced a certain distance from each other and each having an elongate rectangular shape, and four substantially orthogonal walls (side walls) 38a through 38d interconnecting and surrounding the four sides of the flat plates 36a, 36b. The casing 34 houses therein a grid 42 for removing scattered rays of the radiation X from the patient 14, a radiation detector 44 for detecting the radiation X that has passed through the patient 14, and a lead plate 46 for absorbing back scattered rays from the radiation X. The grid 42, the radiation detector 44 and the lead plate 46 are successively arranged in that order from an irradiated surface 40 of the casing 34 which is irradiated with the radiation X. The irradiated surface 40 of the casing 34 may be constructed as the grid 42.

The casing 34 also houses therein a battery 48 as a power supply of the radiation detecting cassette 24, a cassette controller 50 for energizing the radiation detector 44 with electric power supplied from the battery 48, and a transceiver 52 for sending and receiving signals including the information of the radiation X detected by the radiation detector 44, to and from the console 28. The walls 38a through 38d of the casing 34 have an ID display unit 54 for displaying ID information of the patient 14, etc.

The ID display unit 54 comprises a liquid crystal display, for example, including first through fourth display units 56a through 56d mounted respectively on the walls 38a through 38d and exposed on the outside of the casing 34.

The casing 34 further houses therein first detectors 58 mounted on the respective walls 38a through 38d for detecting obstacles which may be present in the neighborhood of the first through fourth display units 56a through 56d, and second detectors 60 mounted on the respective walls 38a through 38d for detecting loads applied in the neighborhood of the first through fourth display units 56a through 56d.

The first detectors 58 comprise first through fourth photosensors 66a through 66d associated respectively with the first through fourth display units 56a through 56d. Each of the first through fourth photosensors 66a through 66d is in the form of a reflective photosensor comprising a light-emitting element (light emitter) 62 for emitting light and a light-detecting element (light detector) 64 for detecting light. The light-emitting element 62 and the light-detecting element 64 are disposed in juxtaposed relation to each other and face in the same direction. The light-emitting element 62 and the light-detecting element 64 are vertically aligned with each other and positioned near the flat plates 36a, 36b, respectively.

The first through fourth photosensors 66a through 66d are disposed respectively in detection holes 68 that are defined in the respective walls 38a through 38d on one side of the first through fourth display units 56a through 56d. The first through fourth photosensors 66a through 66d are exposed to the outside of the casing 34 through the respective detection holes 68. When the casing 34 is placed between the patient 14 and the surgical table 16, the detection holes 68 are open horizontally, and the light-emitting elements 62 and the light-detecting elements 64 of the first through fourth photosensors 66a through 66d face the outside laterally through the detection holes 68.

When the light-emitting element 62 of each of the first through fourth photosensors 66a through 66d is energized, it emits light through the detection hole 68 outwardly from the casing 34. If there is an obstacle located in a position outside of the casing 34 and facing the detection hole 68, the light emitted from the light-emitting element 62 impinges upon and is reflected by the obstacle. The reflected light is detected by the light-detecting element 64, which outputs a detected signal from each of the first through fourth photosensors 66a through 66d to the cassette controller 50.

If the light emitted from the light-emitting element 62 is not reflected and hence not detected by the light-detecting element 64, then it is confirmed that no obstacle is located in a position facing the detection hole 68. Accordingly, the first detectors 58 which comprise the first through fourth photosensors 66a through 66d detect whether there are obstacles in positions facing the respective first through fourth display units 56a through 56d or not.

The second detectors 60 comprise first through fourth pressure sensors 70a through 70d, respectively, mounted on the respective walls 38a through 38d in the neighborhood of the first through fourth display units 56a through 56d. Each of the first through fourth pressure sensors 70a through 70d comprises a strain gage, for example. The first through fourth pressure sensors 70a through 70d may not be mounted on the respective walls 38a through 38d, but may be mounted on the flat plates 36a, 36b near the walls 38a through 38d.

When the radiation detecting cassette 24 is placed between the patient 14 and the surgical table 16, loads that are applied from the patient 14 to the casing 34 near the first through fourth display units 56a through 56d, and detected by the first through fourth pressure sensors 70a through 70d, respectively, which output detected signals to the cassette controller 50. In this manner, the values of the loads applied to the casing 34 near the first through fourth display units 56a through 56d are confirmed.

A shield plate of lead or the like should preferably be placed between the irradiated surface 40 of the casing 34 and the side surfaces of the cassette controller 50, the transceiver 52, and the first and second detectors 58, 60, to protect the cassette controller 50, the transceiver 52, and the first and second detectors 58, 60 against damage which would otherwise be caused if those were irradiated with the radiation X.

Figure 5:
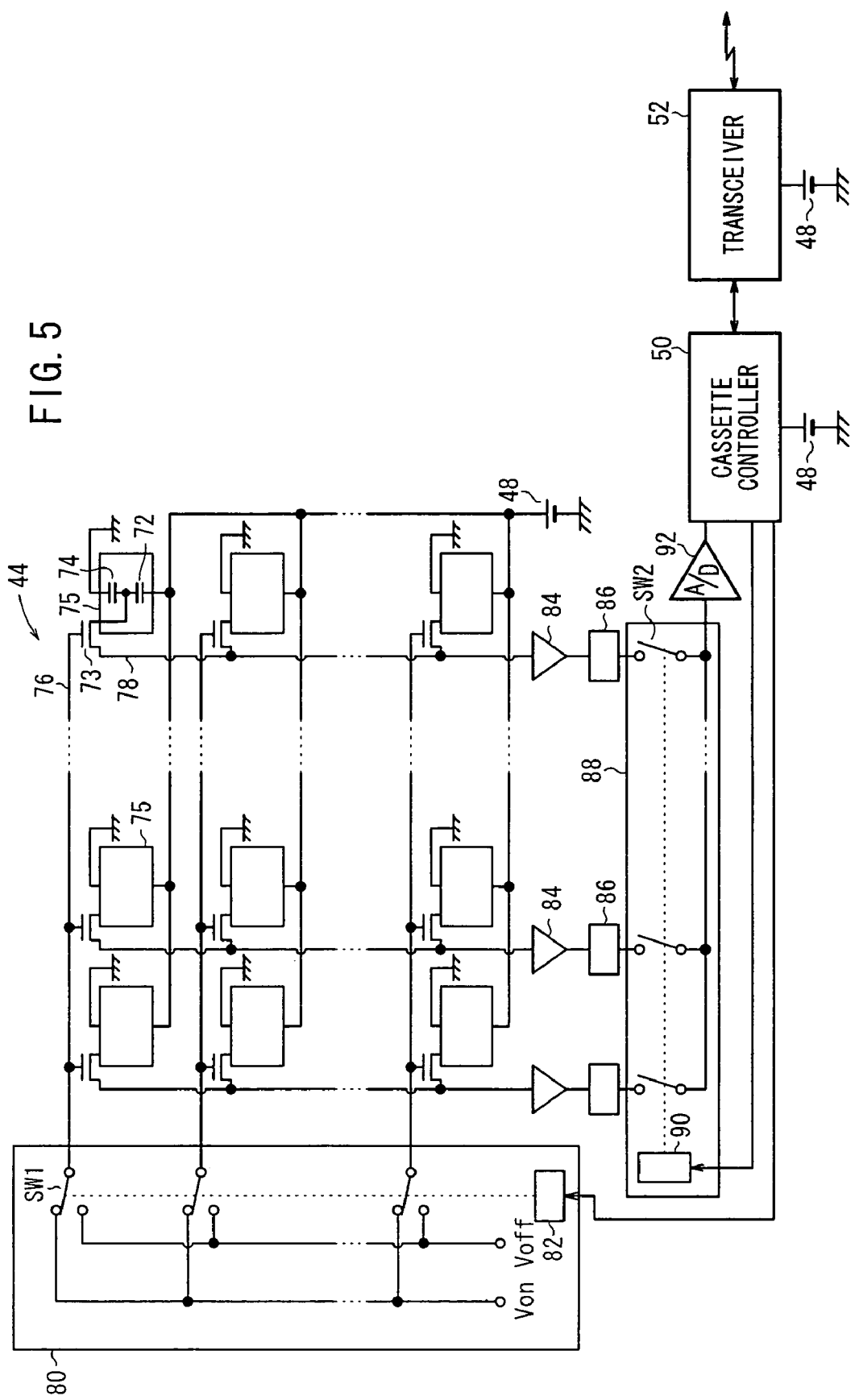
FIG. 5 is a block diagram of a circuit arrangement of a radiation detector in the radiation detecting cassette shown in FIG. 2.

FIG. 5 shows in block form a circuit arrangement of the radiation detector 44. As shown in FIG. 5, the radiation detector 44 comprises an array of thin-film transistors (TFTs) 73 arranged in rows and columns, a photoelectric conversion layer 72 made of a material such as amorphous selenium (a-Se) for generating electric charges upon detection of the radiation X, the photoelectric conversion layer 72 being disposed over the array of TFTs 73, and an array of storage capacitors 74 connected to the photoelectric conversion layer 72. When the radiation X is applied to the radiation detector 44, the photoelectric conversion layer 72 generates electric charges, and the storage capacitors 74 store the generated electric charges. Then, the TFTs 73 are turned on along each row at a time to read out the electric charges from the storage capacitors 74 as an image signal. In FIG. 5, the photoelectric conversion layer 72 and one of the storage capacitors 74 are shown as a pixel 75, and the pixel 75 is connected to one of the TFTs 73. Details of the other pixels 75 are omitted from illustration. Since amorphous selenium tends to change its structure and lose its functionality at high temperatures, it needs to be used within a certain temperature range. Therefore, some means for cooling the radiation detector 44 should preferably be provided in the radiation detecting cassette 24.

The TFTs 73 connected to the respective pixels 75 are connected to respective gate lines 76 extending parallel to the rows and respective signal lines 78 extending parallel to the columns. The gate lines 76 are connected to a line scanning driver 80, and the signal lines 78 are connected to a multiplexer 88 serving as a reading circuit.

The gate lines 76 are supplied with control signals Von, Voff for turning on and off the TFTs 73 along the rows from the line scanning driver 80. The line scanning driver 80 comprises a plurality of switches SW1 for switching between the gate lines 76, and an address decoder 82 for outputting a selection signal for selecting one of the switches SW1 at a time. The address decoder 82 is supplied with an address signal from the cassette controller 50.

The signal lines 78 are supplied with electric charges stored in the storage capacitors 74 of the pixels 75 through the TFTs 73 arranged in the columns. The electric charges supplied to the signal lines 78 are amplified by amplifiers 84 connected respectively to the signal lines 78. The amplifiers 84 are connected through respective sample and hold circuits 86 to the multiplexer 88. The multiplexer 88 comprises a plurality of switches SW2 for switching between the signal lines 78, and an address decoder 90 for outputting a selection signal for selecting one of the switches SW2 at a time. The address decoder 90 is supplied with an address signal from the cassette controller 50. The multiplexer 88 has an output terminal connected to an A/D converter 92. A radiation image signal generated by the multiplexer 88 based on the electric charges from the sample and hold circuits 86 is converted by the A/D converter 92 into a digital image signal representing radiation image information, which is supplied to the cassette controller 50.

Figure 6:
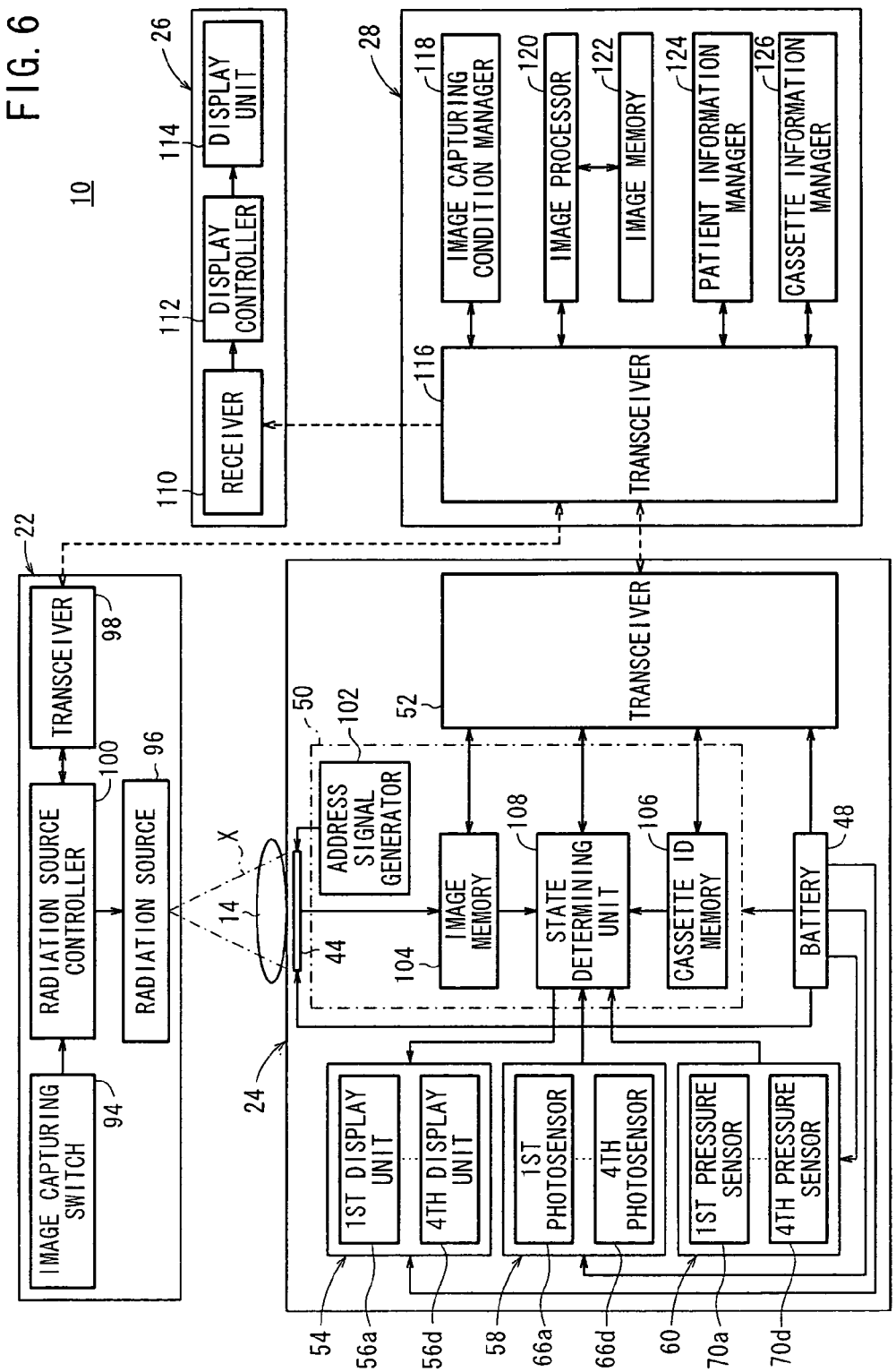
FIG. 6 is a block diagram of the radiation image capturing system shown in FIG. 1.

FIG. 6 shows in block form the radiation image capturing system 10 which comprises the image capturing apparatus 22, the radiation detecting cassette 24, the display device 26, and the console 28.

The image capturing apparatus 22 comprises an image capturing switch 94, a radiation source 96 for outputting the radiation X, a transceiver 98 for receiving image capturing conditions from the console 28 by way of wireless communications and transmitting an image capturing completion signal, etc. to the console 28 by way of wireless communications, and a radiation source controller 100 for controlling the radiation source 96 based on an image capturing start signal supplied from the image capturing switch 94 and image capturing conditions supplied from the transceiver 98.

The radiation detecting cassette 24 houses therein the radiation detector 44, the battery 48, the cassette controller 50, the transceiver 52, the ID display unit 54, and the first and second detectors 58, 60.

The cassette controller 50 comprises an address signal generator 102 for supplying address signals to the address decoder 82 of the line scanning driver 80 and the address decoder 90 of the multiplexer 88 of the radiation detector 44, an image memory 104 for storing the radiation image information detected by the radiation detector 44, and a cassette ID memory 106 for storing cassette ID information for identifying the radiation detecting cassette 24.

The cassette controller 50 also includes a state determining unit 108 for being supplied with detected signals from the first and second detectors 58, 60 and determining one or more of the first through fourth display units 56a through 56d of the ID display unit 54 which are not covered by obstacles such as the patient 14 and which can be seen by the surgeons 18 and other staff members.

Specifically, if light emitted from the light-emitting elements 62 of the first through fourth photosensors 66a through 66d of the first detectors 58 is reflected and detected by the light-detecting elements 64 thereof, then the state determining unit 108 judges that there are obstacles in respective positions facing the first detectors 58, i.e., in respective positions facing the first through fourth display units 56a through 56d near the first detectors 58. Conversely, if light emitted from the light-emitting elements 62 is not reflected and hence not detected by the light-detecting elements 64, then the state determining unit 108 judges that there are no obstacles in respective positions facing the first through fourth display units 56a through 56d near the first detectors 58.

Based on the detected signals from the first through fourth pressure sensors 70a through 70d of the second detectors 60, the state determining unit 108 compares the magnitudes of the load values detected by the first through fourth pressure sensors 70a through 70d with each other, and determines an area of the casing 34 where the load from the patient 14 is applied based on the location of one of the first through fourth pressure sensors 70a through 70d which has detected the greatest load value.

The area of the casing 34 where the load from the patient 14 is detected is considered to be an area where the patient 14 lies because the body weight of the patient 14 is applied thereto. Other areas of the casing 34 where the load from the patient 14 is not detected are considered to be areas where the patient 14 does not lie because the body weight of the patient 14 is not applied thereto.

The transceiver 52 receives a transmission request signal from the console 28 by way of wireless communications, and transmits cassette ID information stored in the cassette ID memory 106 and radiation image information stored in the image memory 104 to the console 28 by way of wireless communications.

The display device 26 comprises a receiver 110 for receiving radiation image information from the console 28, a display controller 112 for controlling the display of the received radiation image information, and a display unit 114 for displaying the radiation image information processed by the display controller 112.

The console 28 comprises a transceiver 116 for transmitting and receiving necessary information including radiation image information, positional information, etc. to and from the image capturing apparatus 22, the radiation detecting cassette 24, and the display device 26 by way of wireless communications, an image capturing condition manager 118 for managing image capturing conditions required for the image capturing apparatus 22 to capture radiation images, an image processor 120 for processing radiation image information transmitted from the radiation detecting cassette 24, an image memory 122 for storing the radiation image information processed by the image processor 120, a patient information manager 124 for managing patient information of the patient 14 whose image is to be captured, and a cassette information manager 126 for managing cassette information transmitted from the radiation detecting cassette 24. The console 28 may be located outside of the operating room 12 insofar as long as it can transmit and receive signals to and from the image capturing apparatus 22, the radiation detecting cassette 24, and the display device 26 by way of wireless communications.

The radiation image capturing system 10 according to the present embodiment is basically constructed as described above, and operation of the radiation image capturing system 10 will be described below.

The radiation image capturing system 10 is installed in the operating room 12 and used when a radiation image of the patient 14 is required by the surgeons 18 who are performing an operation on the patient 14. Before a radiation image of the patient 14 is captured, patent information of the patient 14 to be imaged is registered in the patient information manager 124 of the console 28. If an area of the patient 14 to be imaged and an image capturing method have already been known, such information is registered as image capturing conditions in the image capturing condition manager 118. After the above preparatory process is completed, the surgeons 18 perform an operation on the patient 14.

For capturing a radiation image of the patient 14 during the operation, one of the surgeons 18 or the radiological technician places the radiation detecting cassette 24 between the patient 14 and the surgical table 16 with the irradiated surface 40 facing the image capturing apparatus 22.

Figure 7:
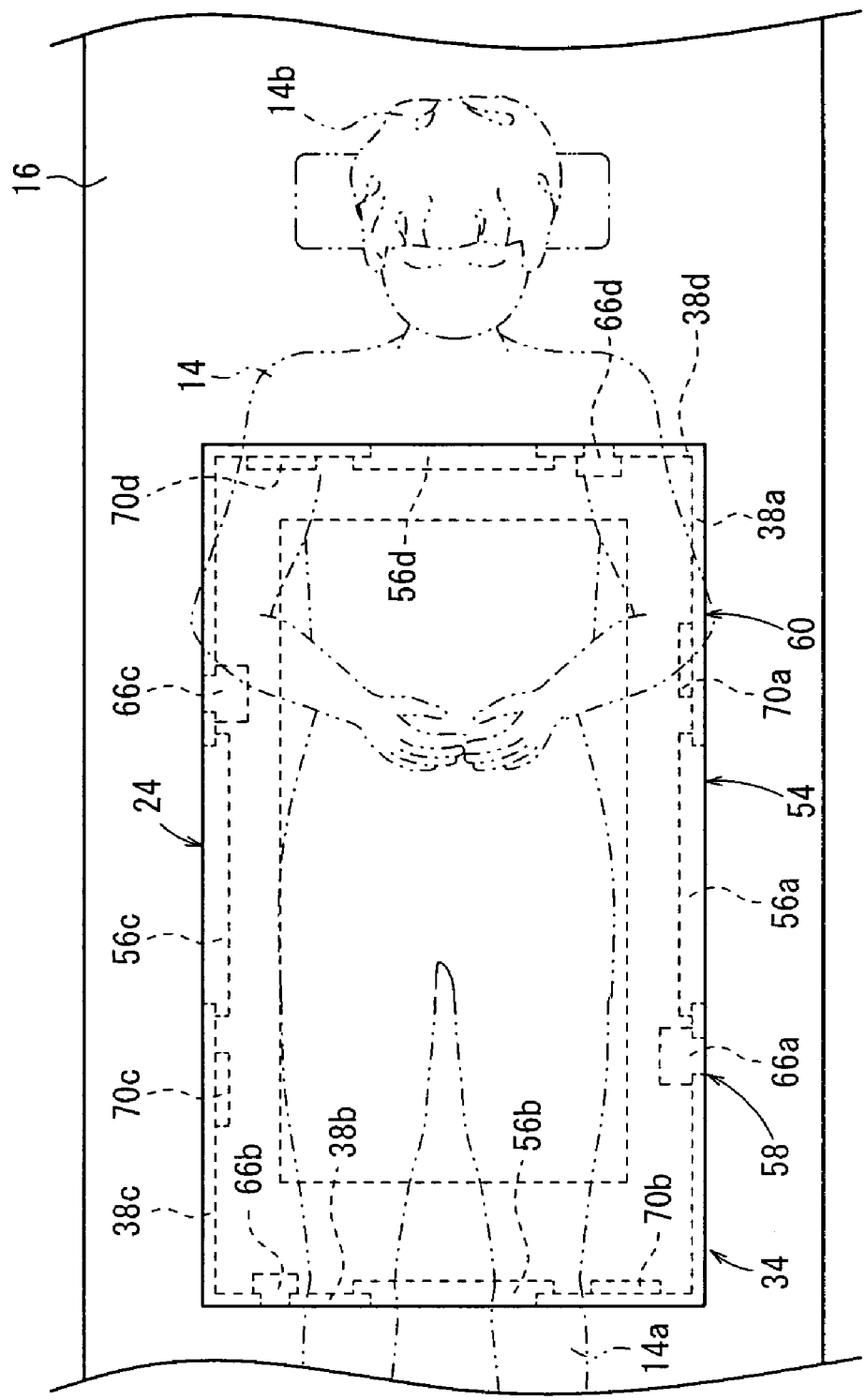
FIG. 7 is an enlarged plan view showing the manner in which the radiation detecting cassette shown in FIG. 2 is placed beneath an affected part of a patient.

At this time, as shown in FIG. 7, the light-emitting elements 62 of the first through fourth photosensors 66a through 66d of the first detectors 58 emit light. The light emitted from the light-emitting elements 62 of the second and fourth photosensors 66b, 66d which face a leg 14a and a head 14b, respectively, of the patient 14 is reflected by the patient 14, and then detected by the light-detecting elements 64 of the second and fourth photosensors 66b, 66d. The light emitted from the light-emitting elements 62 of the first and third photosensors 66a, 66c which do not face the patient 14 is not reflected by the patient 14, and hence is not detected by the light-detecting elements 64 of the first and third photosensors 66a, 66c.

At the same time, the leg 14a of the patient 14 applies a large load to the wall 38b of the casing 34 on which the second pressure sensor 70b is mounted, and the head 14b of the patient 14 applies a large load to the wall 38d of the casing 34 on which the fourth pressure sensor 70d is mounted. As a result, the second and fourth pressure sensors 70b, 70d detect the respective applied loads. The walls 38a, 38c on which the first and third pressure sensors 70a, 70c are mounted, respectively, are subjected to small loads only because the patient 14 does not lie on the walls 38a, 38c. In other words, the load values detected by the first and third pressure sensors 70a, 70c are smaller than the load values detected by the second and fourth pressure sensors 70b, 70d.

The second and fourth photosensors 66b, 66d output respective detected signals to the state determining unit 108, and the first through fourth pressure sensors 70a through 70d which have detected the respective load values output respective detected signals to the state determining unit 108. Based on the detected signals from the first and second detectors 58, 60, the state determining unit 108 judges that the patient 14 lies in the neighborhood of the second and fourth display units 56b, 56d and that the second and fourth display units 56b, 56d have their front faces covered by the patient 14. The state determining unit 108 also judges that the patient 14 does not lie in the neighborhood of the first and third display units 56a, 56c and the first and third display units 56a, 56c have their front faces not covered by the patient 14 but open.

Based on the judgments made by the state determining unit 108, the patient information, the image capturing conditions, the cassette information, etc. sent from the console 28 through the transceiver 116 are output via the state determining unit 108 selectively to the first and third display units 56a, 56c of the ID display unit 54. In other words, the state determining unit 108 functions as a selecting unit for selectively outputting the patient information and other information to those of the first through fourth display units 56a through 56d which are not covered by the patient 14, but can be seen from outside, based on the detected results from the first and second detectors 58, 60.

The doctors 18 and the radiological technician can now reliably and easily confirm the patient information, the image capturing conditions, the cassette information, etc. that are displayed on the first and third display units 56a, 56c of the ID display unit 54. Since the state determining unit 108 outputs no signals to the second and fourth display units 56b, 56d at this time, the second and fourth display units 56b, 56d do not display the patient information, etc.

After having confirmed the patient information, etc. selectively displayed by the ID display unit 54, one of the surgeons 18 or the radiological technician moves the image capturing apparatus 22 to a position confronting the radiation detecting cassette 24, and turns on the image capturing switch 94 to capture a radiation image of the patient 14. The radiation source controller 100 of the image capturing apparatus 22 acquires image capturing conditions about the area of the patient 14 to be imaged from the image capturing condition manager 118 of the console 28 via the transceivers 52, 98 by way of wireless communications. When the radiation source controller 100 receives the image capturing conditions, it controls the radiation source 96 to apply a radiation X at a given dose to the patient 14 according to the acquired image capturing conditions.

The radiation X which has passed through the patient 14 is applied to the grid 42, which removes scattered rays from the radiation X. Then, the radiation X is applied to the radiation detector 44, and converted into electric signals by the photoelectric conversion layer 72 of the pixels 75 of the radiation detector 44. The electric signals are stored as electric charges in the storage capacitors 74 (see FIG. 5). The stored electric charges, which represent radiation image information of the patient 14, are read out from the storage capacitors 74 according to address signals which are supplied from the address signal generator 102 of the cassette controller 50 to the line scanning driver 80 and the multiplexer 88.

Specifically, in response to the address signal supplied from the address signal generator 102, the address decoder 82 of the line scanning driver 80 outputs a selection signal to select one of the switches SW1, which supplies the control signal Von to the gates of the TFTs 73 connected to the gate line 76 corresponding to the selected switch SW1. On the other hand, in response to the address signal supplied from the address signal generator 102, the address decoder 90 of the multiplexer 88 outputs a selection signal to successively turn on the switches SW2 to switch between the signal lines 78 for thereby reading out the electric charges stored in the storage capacitors 74 of the pixels 75 connected to the selected gate line 76, through the signal lines 78, to obtain the radiation image information.

The electric charges read out from the storage capacitors 74 of the pixels 75 connected to the selected gate line 76 are amplified by the respective amplifiers 84, sampled by the sample and hold circuits 86, and supplied to the multiplexer 88. Based on the supplied electric charges, the multiplexer 88 generates and supplies a radiation image signal to the A/D converter 92, which converts the radiation image signal into a digital signal. The digital signal which represents the radiation image information is temporally stored in the image memory 104 of the cassette controller 50, and thereafter transmitted via the transceiver 52 to the console 28 by wireless communications.

The radiation image information transmitted to the console 28 is received by the transceiver 116, processed by the image processor 120, and then stored in the image memory 122 in association with the patient information of the patient 14 registered in the patient information manager 124.

The radiation image information processed by the image processor 120 is transmitted from the transceiver 116 to the display device 26. In the display device 26, the receiver 110 receives the radiation image information, and the display controller 112 controls the display unit 114 to display a radiation image based on the radiation image information. The surgeons 18 perform the operation on the patient 14 while visually confirming the radiation image displayed on the display unit 114.

Since no cables for transmitting and receiving signals are connected between the radiation detecting cassette 24 and the console 28, between the image capturing apparatus 22 and the console 28, and between the console 28 and the display device 26, it is not necessary to lay such cables on the floor of the operating room 12 and hence there are no cable-induced obstacles to the operation performed by the surgeons 18, the radiological technician, or other staff members in the operating room 12.

In the above embodiment, the radiation detecting cassette 24 has the first detectors 58 which comprise the first through fourth photosensors 66a through 66d, for detecting obstacles facing the first through fourth display units 56a through 56d, and the second detectors 60 which comprise the first through fourth pressure sensors 70a through 70d, for detecting loads applied to the first through fourth display units 56a through 56d. However, the radiation detecting cassette 24 may have either the first detectors 58 or the second detectors 60.

After the patient information, etc. have been displayed on the first through fourth display units 56a through 56d of the ID display unit 54, only the patient information, etc. displayed on those of the first through fourth display units 56a through 56d which are judged as being covered by the patient 14 based on the detected results from the first detectors 58 and the second detectors 60 may be turned off.

The first detectors 58 may comprise darkness sensors for detecting ambient darkness around the first through fourth display units 56a through 56d, rather than photosensors. When such darkness sensors detect ambient darkness, the state determining unit 108 judges that the first through fourth display units 56a through 56d are covered by the patient 14.

According to the present embodiment, as described above, the casing 34 of the radiation detecting cassette 24 which houses the radiation detector 44 therein has the first through fourth display units 56a through 56d of the ID display unit 54 which are mounted respectively on the walls 38a through 38d. The state determining unit 108 determines those of the first through fourth display units 56a through 56d which can be seen from outside based on the detected results from the first and second detectors 58, 60, and displays the patient information, etc. on only the determined ones of the first through fourth display units 56a through 56d. As a result, the surgeons 18 can reliably and easily see those of the first through fourth display units 56a through 56d which are displaying the patient information, etc. and which are not covered by the patient 14, for thereby reliably confirming the displayed patient information, etc.

The radiation detecting cassette 24 has the first detectors 58 each comprising the light-emitting element 62 for emitting light and the light-detecting element 64 for detecting the light. When the light-detecting element 64 detects light, the state determining unit 108 can detect which of the first through fourth display units 56a through 56d near the first detectors 58 are facing the patient 14, and can display the patient information, etc. selectively on those of the first through fourth display units 56a through 56d which are not facing the patient 14, based on the detected results.

The radiation detecting cassette 24 has the second detectors 60 for detecting loads applied to the casing 34 near the first through fourth display units 56a through 56d. The state determining unit 108 can detect which of the first through fourth display units 56a through 56d are facing the patient 14 based on the load values detected by the second detectors 60, and can display the patient information, etc. selectively on those of the first through fourth display units 56a through 56d which are not facing the patient 14, based on the detected results.

When the radiation detecting cassette 24 is used in the operating room 12 or the like, blood stains and contaminants may be applied to the radiation detecting cassette 24. The radiation detecting cassette 24 may be of a water-resistant, sealed structure so that it can be sterilized and cleaned to remove such blood stains and contaminants for repetitive use.

The radiation detecting cassette 24 is not limited to being used in the operating room 12, but may be used in combination with medical examinations and doctor's visits to patient rooms in the hospital.

Wireless communications between the radiation detecting cassette 24 and external devices may be carried out using not only radio waves but also optical signals such as infrared signals or the like.

Figure 8:
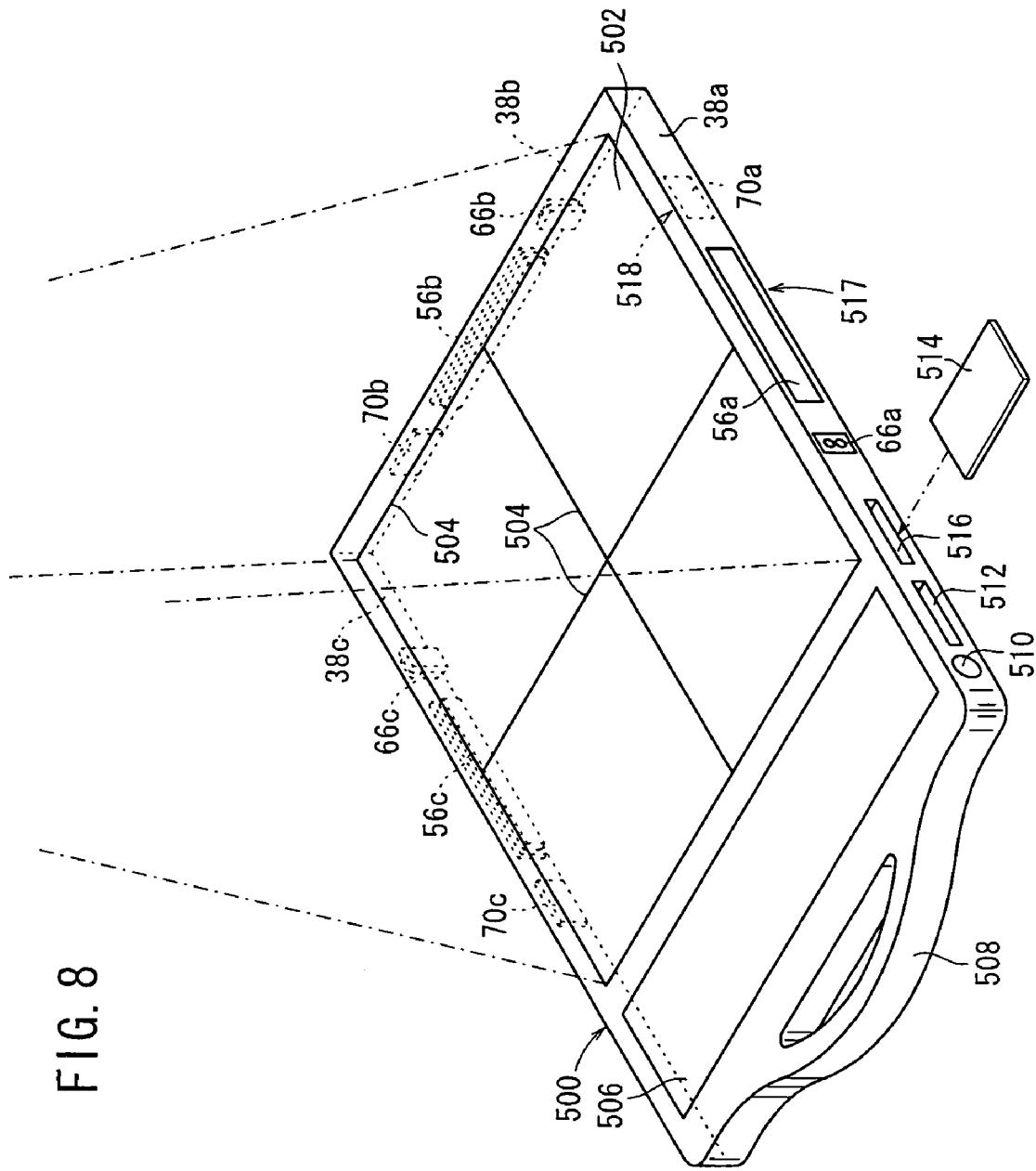
FIG. 8 is a perspective view of a radiation detecting cassette according to another embodiment of the present invention.

FIG. 8 shows in perspective a radiation detecting cassette 500 according to another embodiment of the present invention.

As shown in FIG. 8, the radiation detecting cassette 500 has guide lines 504 drawn on the irradiated surface of a casing 502 as a reference mark for an image capturing area and an image capturing position. Using the guide lines 504, the subject to be imaged can be positioned with respect to the radiation detecting cassette 500 and the range in which the radiation is to be applied to the radiation detecting cassette 500 can be determined, for thereby recording radiation image information in an appropriate image capturing area of the radiation detecting cassette 500.

The radiation detecting cassette 500 also has a display unit 506 outside of the image capturing area thereof for displaying various items of information about the radiation detecting cassette 500. Specifically, the display unit 506 displays ID information of the subject whose radiation image is recorded in the radiation detecting cassette 500, the number of times that the radiation detecting cassette 500 has been used, an accumulated exposed dose, the charged state (remaining power level) of the battery 48 housed in the radiation detecting cassette 500, image capturing conditions for radiation image information, and a positioning image representing the subject positioned with respect to the radiation detecting cassette 500, etc. The radiological technician can confirm the subject based on the ID information displayed on the display unit 506, also confirm in advance that the radiation detecting cassette 500 is in a usable state, position the desired area of the subject to be imaged with respect to the radiation detecting cassette 500 based on the displayed positioning image, and capture optimum radiation image information in the radiation detecting cassette 500.

The radiation detecting cassette 500 includes a handle 508 to be gripped by the user to handle and carry the radiation detecting cassette 500 with ease.

The radiation detecting cassette 500 also has an input terminal 510 for connection to an AC adapter, a USB (Universal Serial Bus) terminal 512, and a card slot 516 for receiving a memory card 514, on a side wall of the casing of the radiation detecting cassette 500.

When the charging function of the battery 48 housed in the radiation detecting cassette 500 is low or when there is not enough time to charge the battery 48, an AC adapter is connected to the input terminal 510 to supply electric power from an external source for thereby making the radiation detecting cassette 500 immediately operable.

The USB terminal 512 or the card slot 516 can be used when the radiation detecting cassette 500 is unable to send and receive information to and from an external device such as the console 28 or the like by way of wireless communications. Specifically, when a USB cable connected to the external device is connected to the USB terminal 512, the radiation detecting cassette 500 can send and receive information to and from the external device by way of wired communications through the USB terminal 512 and the USB cable. Alternatively, the memory card 514 is inserted into the card slot 516 and necessary information from the radiation detecting cassette 500 is recorded into the memory card 514. Thereafter, the memory card 514 is removed from the card slot 516 and inserted to the external device to send the information to the external device.

The radiation detecting cassette 500 also includes first through third display units 56a through 56c mounted on respective three walls 38a through 38c except the wall on which the handle 508 is mounted, first detectors 517 comprising first through third photosensors 66a through 66c mounted on the respective walls 38a through 38c for detecting obstacles near the first through third display units 56a through 56c, and second detectors 518 comprising first through third pressure sensors 70a through 70c mounted on the respective walls 38a through 38c for detecting loads applied to the casing 502 near the respective first through third display units 56a through 56c.

Figure 9:
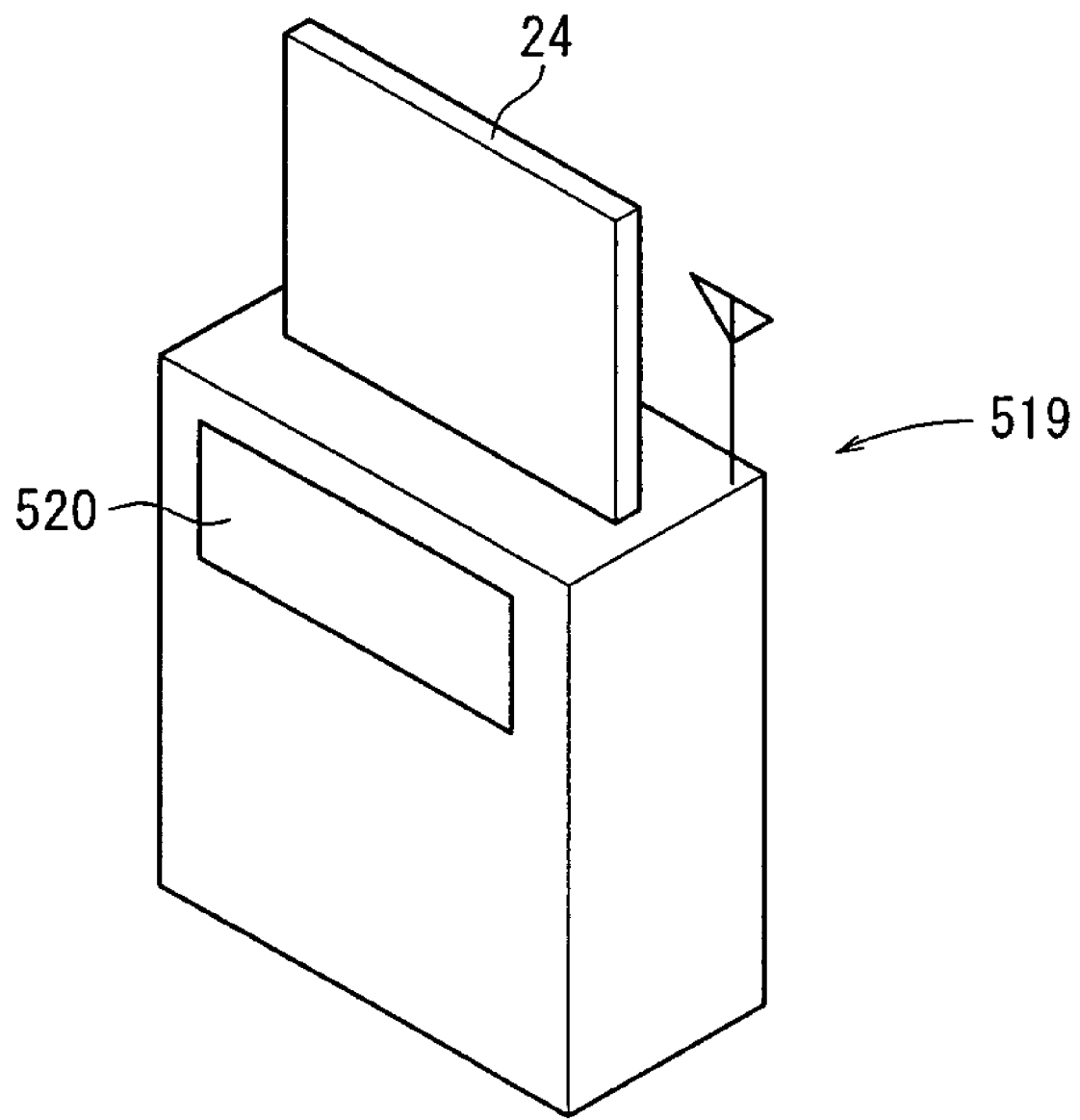
FIG. 9 is a perspective view of a cradle for charging a battery in the radiation detecting cassette.

FIG. 9 shows a cradle 519 for charging the battery 48 housed in the radiation detecting cassette 24 or 500. The cradle 519 is positioned in the operating room 12 or a desired location in the hospital. The cradle 519 may not only be able to charge the battery 48, but also have a wireless or wired communication function to send and receive necessary information to and from an external device such as the HIS, the RIS, the console 28, or the like. The information that is sent from the cradle 519 may include radiation image information recorded in the radiation detecting cassette 24, 500 loaded in the cradle 519.

The cradle 519 has a display unit 520 for displaying the charged state of the battery 48 housed in the radiation detecting cassette 24, 500 and necessary information including radiation image information acquired from the radiation detecting cassette 24, 500.

A plurality of cradles 519 may be connected to a network, and charged states of the batteries 48 housed in the radiation detecting cassettes 24, 500 loaded in the respective cradles 519 may be retrieved through the network, so that the user can confirm the locations of any radiation detecting cassettes 24, 500 whose batteries 48 are sufficiently charged, based on the retrieved charged states of the batteries 48.

Although certain preferred embodiments of the present invention have been shown and described in detail, it should be understood that various changes and modifications may be made therein without departing from the scope of the appended claims.

What is claimed is:

1. A cassette comprising:
    a casing housing therein a radiation conversion panel for detecting a radiation applied from a radiation source that has passed through a subject, and converting the detected radiation into radiation image information;
    a plurality of display units mounted respectively on at least two side walls of said casing, for displaying at least subject information about the subject; and
    a selecting unit for selecting at least one of said display units which can be seen from outside, to display said at least subject information on said at least one of said display units which is selected by said selecting unit,
    wherein said selecting unit comprises;
    a plurality of detectors for a state of the subject near said display units; and
    a determining unit for determining at least one of said display units which is not facing the subject based on the state of the subject which is detected by said detectors;
    wherein said detectors are associated respectively with said display units.

2. A cassette according to claim 1, wherein said detectors comprise optical sensors comprising respective light emitters for emitting light and respective light detectors for detecting the emitted light, for detecting whether or not said display units face the subject, based on the light detected by said light detectors.

3. A cassette according to claim 1, wherein said detectors comprise pressure sensors for detecting loads applied to said casing near said display units.

4. A cassette according to claim 1, wherein said display units are mounted on respective side walls of said casing which face neither the subject nor a bed on which the subject lies, when said casing is placed between the subject and said bed.

5. A cassette according to claim 1, wherein said detectors comprise darkness sensors disposed respectively near said display units for detecting ambient darkness around the display units.

\* \* \* \* \*